United States Patent
Feng et al.

(10) Patent No.: US 12,511,318 B2
(45) Date of Patent: Dec. 30, 2025

(54) MULTI-SYSTEM-BASED INTELLIGENT QUESTION ANSWERING METHOD AND APPARATUS, AND DEVICE

(71) Applicant: BEIJING BAIDU NETCOM SCIENCE TECHNOLOGY CO., LTD., Beijing (CN)

(72) Inventors: Xinwei Feng, Beijing (CN); Meng Tian, Beijing (CN); Feifei Li, Beijing (CN); Hongjian Shi, Beijing (CN); Wenbin Jiang, Beijing (CN); Xueqian Wu, Beijing (CN); Chenyang Guo, Beijing (CN); Yu Wang, Beijing (CN); Yu Sun, Beijing (CN); Shuaiyu Chen, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 495 days.

(21) Appl. No.: 17/820,285

(22) Filed: Aug. 17, 2022

(65) Prior Publication Data

US 2022/0391426 A1 Dec. 8, 2022

(30) Foreign Application Priority Data

Mar. 2, 2022 (CN) .......................... 202210201842.8

(51) Int. Cl.
*G06F 16/3329* (2025.01)
*G06F 16/2455* (2019.01)
*G06F 40/30* (2020.01)

(52) U.S. Cl.
CPC ...... *G06F 16/3329* (2019.01); *G06F 16/2455* (2019.01); *G06F 40/30* (2020.01)

(58) Field of Classification Search
CPC .. G06F 16/3329; G06F 16/2455; G06F 40/30; G06F 16/90332; G06F 40/216;
(Continued)

(56) References Cited

U.S. PATENT DOCUMENTS

| 12,008,456 B2 * | 6/2024 | Remis ....................... G06N 3/08 |
| 2004/0243568 A1 * | 12/2004 | Wang ................ G06F 16/24522 |
| | | 707/E17.084 |

(Continued)

FOREIGN PATENT DOCUMENTS

| CN | 106919655 A | 7/2017 |
| CN | 107832342 A | 3/2018 |

(Continued)

OTHER PUBLICATIONS

Office Action of corresponding Chinese Application No. 202210201842. 8, dated Sep. 25, 2023, 9 pages.

(Continued)

*Primary Examiner* — Richemond Dorvil
*Assistant Examiner* — Zeeshan Mahmood Shaikh
(74) *Attorney, Agent, or Firm* — Tucker Ellis LLP

(57) ABSTRACT

The present disclosure provides a multi-system-based intelligent question answering method and apparatus, and a device, relating to the field of artificial intelligence, in particular to the field of knowledge graph. The specific implementation solution is: determining a question category of question information in response to a question answering instruction of a user, wherein the question answering instruction is used to indicate the question information; determining a query engine corresponding to the question category, and invoking multiple question analysis systems corresponding to the query engine according to the query engine; and feeding back answer information to the user when the answer information corresponding to the question (Continued)

information is determined according to a current question analysis system in a process of processing the question information by sequentially using the multiple question analysis systems according to system priorities of the question analysis systems.

19 Claims, 9 Drawing Sheets

(58) Field of Classification Search
CPC .... G06F 40/295; G06F 40/35; G06F 16/3331; G06F 16/2452; G06F 16/2428; G06F 16/24532; G06F 16/248; G06F 16/3344; G06F 16/9024; G06F 16/9038; G06F 40/279; G06N 3/02
See application file for complete search history.

(56) References Cited

U.S. PATENT DOCUMENTS

| | | | | |
|---|---|---|---|---|
| 2012/0101807 | A1* | 4/2012 | Heo | G06F 16/3331 704/9 |
| 2016/0232221 | A1* | 8/2016 | McCloskey | G06F 16/285 |
| 2019/0042988 | A1* | 2/2019 | Brown | G06F 16/9535 |
| 2020/0042649 | A1* | 2/2020 | Bakis | H04L 51/02 |
| 2022/0343082 | A1* | 10/2022 | Lee | G06N 5/02 |

FOREIGN PATENT DOCUMENTS

| | | |
|---|---|---|
| CN | 108153915 A | 6/2018 |
| CN | 109033277 A | 12/2018 |
| CN | 112749265 A | 5/2021 |
| CN | 112784590 A | 5/2021 |
| CN | 112860865 A | 5/2021 |
| CN | 113127617 A | 7/2021 |
| JP | 2005-346160 A | 12/2005 |
| JP | 2006-244102 A | 9/2006 |
| JP | 2017-076403 A | 4/2017 |
| JP | 2019-012439 A | 1/2019 |
| JP | 2019-185521 A | 10/2019 |
| JP | 2020-047246 A | 3/2020 |
| JP | 2021-168107 A | 10/2021 |
| WO | 2016/104736 A1 | 6/2016 |
| WO | 2021/000555 A1 | 1/2021 |

OTHER PUBLICATIONS

Office Action of corresponding Japanese Application No. 2022-131721, dated Nov. 1, 2023, 14 pages.

Notice of Registration Procedure and Notice of grant of patent right for invention for corresponding Chinese Application No. 202210201842.8, dated Apr. 19, 2024, 13 pages.

Ming Gao et al., "Research on Industry Question Answering System Based on Near Neighbor Vector Search", Journal of Physics: Conference Series 1827 012009, Dec. 31, 2021, 9 pages.

Shifeng Yue et al., "Research on Intelligent Reply System: A Survey", Journal of Cyber Security, vol. 5 No. 1, Jan. 15, 2020, 15 pages, English abstract.

* cited by examiner

MULTI-SYSTEM-BASED INTELLIGENT QUESTION ANSWERING METHOD AND APPARATUS, AND DEVICE

CROSS-REFERENCE TO RELATED APPLICATIONS

This application claims priority to Chinese Patent Application No. 202210201842.8, filed on Mar. 2, 2022, which is hereby incorporated by reference in its entirety.

TECHNICAL FIELD

The present disclosure relates to a knowledge graph in artificial intelligence, in particular, to a multi-system-based intelligent question answering method and apparatus, and a device.

BACKGROUND

With the development of intelligent technology and natural language technology, intelligent question answering can be provided for users. The user provides a voice or text question, and then the intelligent system provides the user with an answer.

In the existing art, a frequently-asked questions (FAQ) system can be used to process question information inputted by the user, and then output the answer for the user.

However, in the above way, the question and the answer corresponding to the question are pre-built in the FAQ system, then the answer is determined by directly searching for the answer corresponding to the question, when there is no pre-built answer in the FAQ system, it is impossible to query the answer corresponding to the question information that the user inputs, which does not satisfy a wide range of answer needs.

SUMMARY

The present disclosure provides a multi-system-based intelligent question answering method and apparatus, and a device.

In a first aspect of the present disclosure, a multi-system-based intelligent question answering method is provided, including:
  determining a question category of question information in response to a question answering instruction of a user, where the question answering instruction is used to indicate the question information;
  determining a query engine corresponding to the question category, and invoking multiple question analysis systems corresponding to the query engine according to the query engine; and
  feeding back answer information to the user when the answer information corresponding to the question information is determined according to a current question analysis system in a process of processing the question information by sequentially using the multiple question analysis systems according to system priorities of the question analysis systems.

In a second aspect of the present disclosure, an electronic device is provided, includes:
  at least one processor; and
  a memory communicatively connected to the at least one processor; where,
  the memory stores an instruction executable by the at least one processor, and the instruction is executed by the at least one processor to enable the at least one processor to execute the method of the first aspect.

In a third aspect of the present disclosure, a non-transitory computer-readable storage medium storing computer instructions is provided, where the computer instruction is used to enable the computer to execute the method of the first aspect.

It should be understood that the content described in this section is not intended to identify key or important features in the embodiments of present disclosure, nor is it intended to limit the scope of the present disclosure. Other features of the present disclosure will become readily comprehensible through the following description.

BRIEF DESCRIPTION OF DRAWINGS

The accompanying drawings are used to better understand the present scheme, but do not constitute a limitation to the present disclosure.

DESCRIPTION OF EMBODIMENTS

Exemplary embodiments of the present disclosure will be described hereunder with reference to the accompanying drawings, which include therein various details of the embodiments of the present disclosure to facilitate understanding and should be considered as to be merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

The present disclosure provides a multi-system-based intelligent question answering method and apparatus, and a device, which are applied to the field of the knowledge graphs in the field of artificial intelligence, so as to solve the problem that the current FAQ system cannot meet the wide range of answer needs of users.

Figure 1:
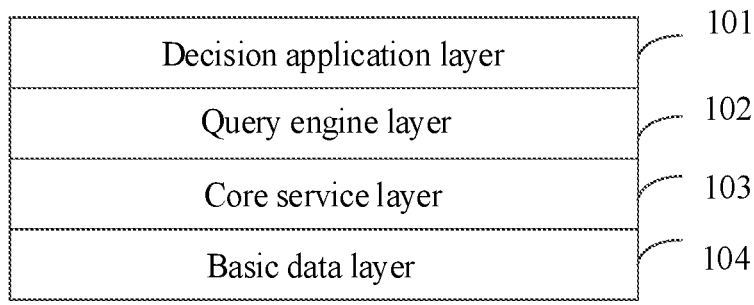
FIG. 1 is a schematic diagram according to a first embodiment of the present disclosure.

In the present disclosure, FIG. 1 is a schematic diagram according to a first embodiment of the present disclosure, where multiple question analysis systems are included. After a question answering instruction of a user is obtained in the decision application layer 101, the question answering instruction of the user is classified, the question information indicated by the question answering instruction of the user is determined, and a final question category is determined according to the question information in the decision application layer 101, the question category is in the query engine layer 102, after the question category is determined in the query engine layer 102, the category of the question analysis system is determined in the core service layer 103, the question analysis system obtains data information from various databases in the basic data layer 104, where the data types in the basic data layer 104 include a knowledge graph, a SQL/table, a rule base, a document base, a FAQ base, and a proper noun base.

Figure 2:
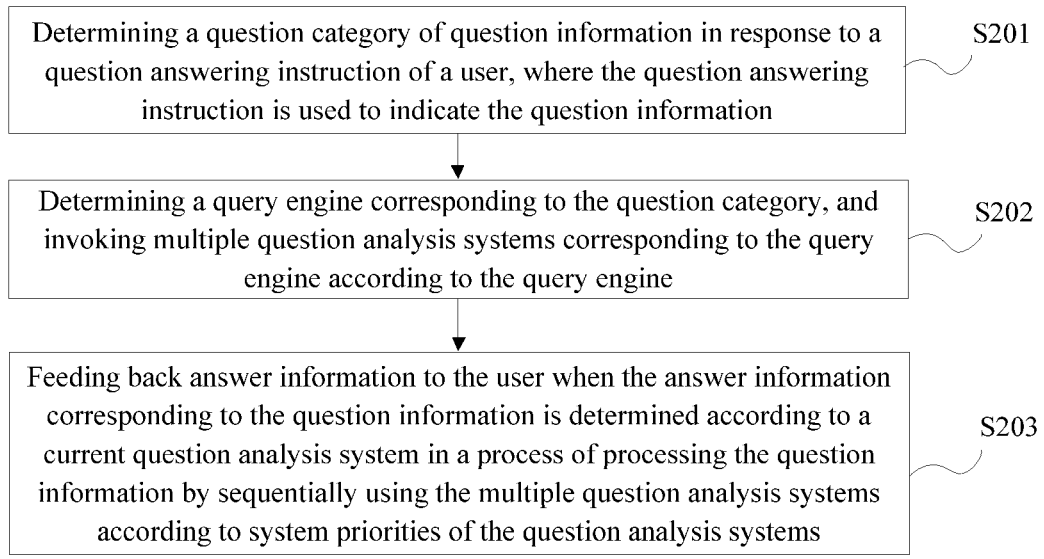
FIG. 2 is a schematic diagram according to a first embodiment of the present disclosure.

FIG. 2 is a schematic diagram according to a first embodiment of the present disclosure, the present disclosure provides a multi-system-based intelligent question answering method, including the following.

S201, determining a question category of question information in response to a question answering instruction of a user, where the question answering instruction is used to indicate the question information.

In an example, the question answering instruction of the user refers to a query instruction message sent by the user in the enterprise document, where the query instruction message may be in the form of text or in the form of voice. Further, the enterprise document may include content such as pictures, catalogues, titles, tables, and formulas, the content contained in the enterprise document is relatively large in length and contains several types of content. Therefore, it is necessary to analyze the question category of the question information indicated by the question answering instruction according to the question answering instruction of the user, and query the question answering instruction of the user in the enterprise document according to the question category. Among them, the question category is used to distinguish the type of the question answering instruction of the user. The advantage of this setting is that the data required by the question category can be queried according to different question categories, thereby improving the query efficiency.

S202, determining a query engine corresponding to the question category, and invoking multiple question analysis systems corresponding to the query engine according to the query engine.

In an example, the query engine refers to providing users with comprehensive information services based on preset algorithms, where, the preset algorithms include web crawling algorithms, retrieval sorting algorithms, web page processing algorithms, big data processing algorithms and natural language processing algorithms. In this embodiment, the content in the question analysis system determined by different query engine is different, for example, the query engine may include a digital category engine, a short text category engine, a long text category engine, a general requirement category engine and a judgment category engine. The advantage of this setting is that the algorithms used by different engines are different, thereby improving query efficiency.

S203, feeding back answer information to the user when the answer information corresponding to the question information is determined according to a current question analysis system in a process of processing the question information by sequentially using the multiple question analysis systems according to system priorities of the question analysis systems.

In this embodiment, after obtaining the order of the system priorities of the question analysis systems, when the priority of the current question analysis system is the first priority, the question information is processed according to the current question analysis system, the answer information corresponding to the question information is obtained according to the current question analysis system, and the answer information is fed back to the user. If the answer information obtained by the question analysis system with the first priority is empty, the question information is processed by the question analysis system with the second priority, the answer information corresponding to the question information is obtained according to the question analysis system with the second priority, and the answer information is fed back to the user. If the answer information obtained by the question analysis system with the second priority is also empty, the question information is processed by the question analysis system with the third priority until the answer information is obtained. Further, in the process of processing the same question information by different question analysis system, the determined answer information is different, the answer information determined by the question analysis system with higher priority is more accurate than the answer information determined by the question analysis system with lower priority.

The present disclosure provides a multi-system-based intelligent question answering method, including: determining a question category of question information in response to a question answering instruction of a user, where the question answering instruction is used to indicate the question information; determining a query engine corresponding to the question category, and invoking multiple question analysis systems corresponding to the query engine according to the query engine; and feeding back answer information to the user when the answer information corresponding to the question information is determined according to a current question analysis system in a process of processing the question information by sequentially using the multiple question analysis systems according to system priorities of the question analysis systems. By adopting the technical solution, the problem that the current FAQ system cannot meet the wide range of answer needs of users can be solved.

Figure 3:
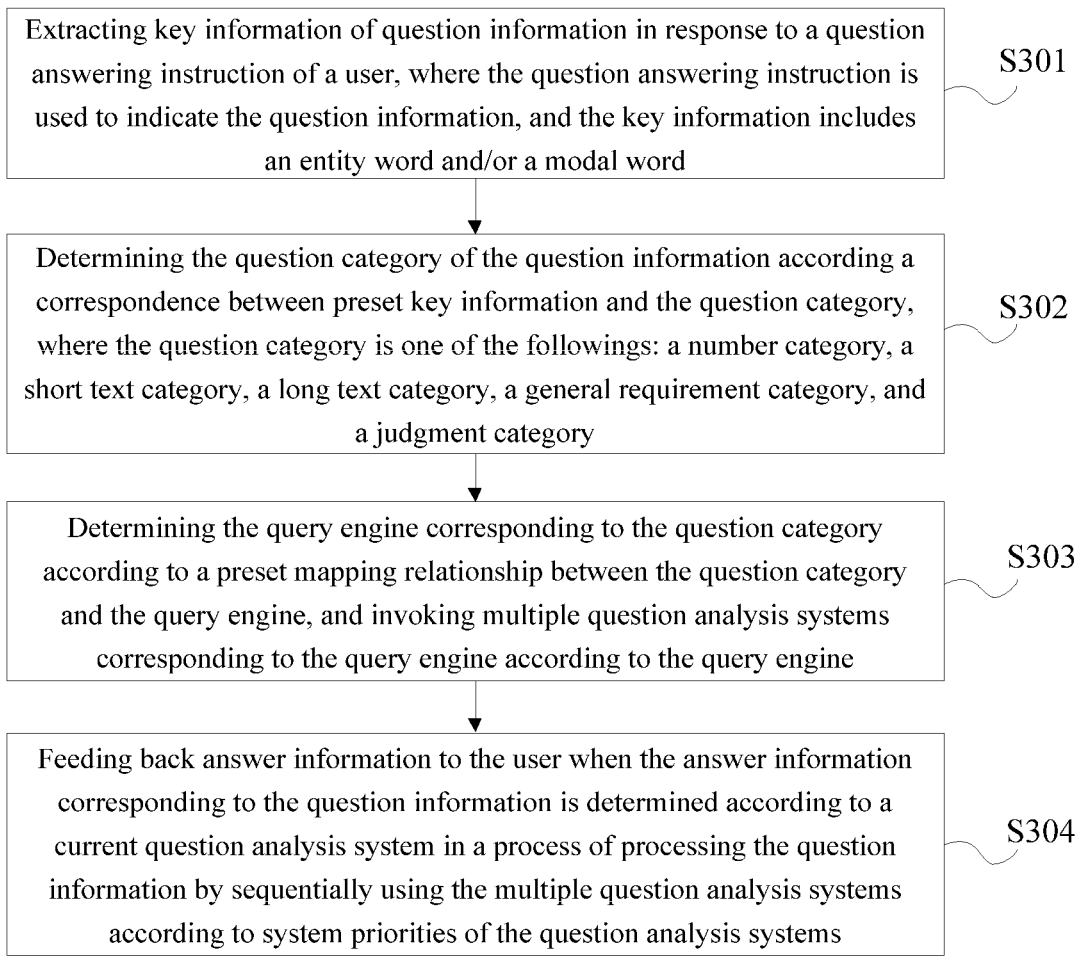
FIG. 3 is a schematic diagram according to a second embodiment of the present disclosure.

FIG. 3 is a schematic diagram according to a second embodiment of the present disclosure, the present disclosure provides a multi-system-based intelligent question answering method, including the following.

S301, extracting key information of question information in response to a question answering instruction of a user, where the question answering instruction is used to indicate the question information, and the key information includes an entity word and/or a modal word.

In one example, the question information includes multiple pieces of key information, where different key information represents different meanings. Further, the key information includes an entity word and a modal word; the entity word can be a place name, a person name or an attribute, and the modal word can be a connecting word such as "do", "of" or "and".

In this embodiment, by extracting the key information in the question information, the semantic content represented by the question information can be analyzed, for example, the question information can be "What is the height of A?", the key information in the question information is the entity word "A", the modal word "of", the entity word "height", the modal word "is" and the modal word "what".

S302, determining the question category of the question information according a correspondence between preset key information and the question category, where the question category is one of the followings: a number category, a short text category, a long text category, a general requirement category, and a judgment category.

In an example, there is a correspondence between the preset key information and the question category, for example, the preset key information can be "how many" corresponding to the number category in the question category; the preset key information can also be "whether" corresponding to the judgment category in the question category etc. After the key information is acquired, the question category to which the question information belongs is determined according to the correspondence between the preset key information and the question category.

S303, determining the query engine corresponding to the question category according to a preset mapping relationship between the question category and the query engine, and invoking multiple question analysis systems corresponding to the query engine according to the query engine.

In an example, there is a mapping relationship between a preset question category and a query engine, different question categories use different query engines, since different query engines use different algorithms, based on the different determined query engines, the algorithms used by invoking the problem analysis systems are different, and the types of data analyzed by the invoked problem analysis system are also different. However, the priorities of the question analysis systems invoked by different query engines are the same.

Further, the multiple question analysis systems include: a knowledge graph system, a reasoning question answering system, a document question answering system and a frequently-asked questions FAQ question answering system.

The knowledge graph system is used to indicate answer information corresponding to an entity in the question information.

The reasoning question answering system is used to indicate a reasoning template corresponding to the question information, where the reasoning template is used to determine the answer information, the reasoning template includes multiple filling points with an order relationship, and the filling point has a word characteristic.

The document question answering system is used to indicate a paragraph corresponding to the question information, where the paragraph is used to determine the answer information.

The FAQ question answering system is used to indicate a further question related to the question information, where the further question and the question information are used to determine the answer information.

In this embodiment, the knowledge graph system is a system composed of a series of different graphs showing the knowledge development process and structural relationship, the visualization technology can be used to describe the knowledge resource and its carrier, mine, analyze, construct, and draw and show knowledge and the interconnections between them. The knowledge graph system can input question information from the knowledge base of the knowledge graph, and automatically query, calculate, and reason from the knowledge graph base to find the answer through performing semantic understanding and analysis on the question information.

The reasoning question answering system is a system that uses a certain reasoning rule to query and calculate to obtain answer, and the reasoning rule may be the simple answer calculation logic.

The document question answering system refers to the question answering system oriented to the document knowledge base, the core technology is machine reading comprehension. The machine reading comprehension refers to allowing a machine to read text, then answer the question related to the reading content, and equipping the computer with the ability to extract knowledge from textual data and answer the question.

The frequently-asked questions (FAQ) question answering system provides some possible frequently-asked questions pairs in advance, and makes the above frequently-asked questions pairs public. The advantage of this setting is that multiple question analysis systems can be used in combination, and the advantage of each question analysis system can be well utilized.

Further, the system priority is preset; or the system priority is confirmed by the user; or the system priority represents an amount of data contained in the question analysis system.

In this embodiment, the system priority can be preset. For example, the system priority can be set in a descending order as FAQ question answering system, the knowledge graph system, the reasoning question answering system and the document question answering system. It can also be the system priority confirmed by the user, at this time, the set system priority can be set according to user preferences, for example, if the user needs the priority of the knowledge graph system to be higher than that of the document question answering system, the priority order of the knowledge graph system is set first. The advantage of this is that it can adapt to a variety of usage scenarios, thus making the recommended answer information more accurate.

Further, the system priority can also be the amount of data contained in the question analysis system, a question analysis system with a larger amount of data has a higher priority and vice versa. For example, when the data amount of data in the document question answering system is greater than that of the FAQ question answering system, then the system priority of the document question answering system is set to be higher than that of the FAQ question answering system.

S304, feeding back answer information to the user when the answer information corresponding to the question information is determined according to a current question analysis system in a process of processing the question information by sequentially using the multiple question analysis systems according to system priorities of the question analysis systems.

Exemplarily, for this step, reference may be made to step S203, which will not be repeated here.

The present disclosure provides a multi-system-based intelligent question answering method, including: extracting key information of question information in response to a question answering instruction of a user, where the question answering instruction is used to indicate the question information, and the key information includes an entity word and/or a modal word; determining the question category of the question information according a correspondence between preset key information and the question category; determining the query engine corresponding to the question category according to a mapping relationship between the preset question category and the query engine, and invoking multiple question analysis systems corresponding to the query engine according to the query engine; and feeding back answer information to the user when the answer information corresponding to the question information is determined according to a current question analysis system in a process of processing the question information by sequentially using the multiple question analysis systems according to system priorities of the question analysis systems. By adopting this technical solution, the overall recall rate of the answer information can be improved, and the problem of the semantic and generalization of the question information can be solved.

Figure 4:
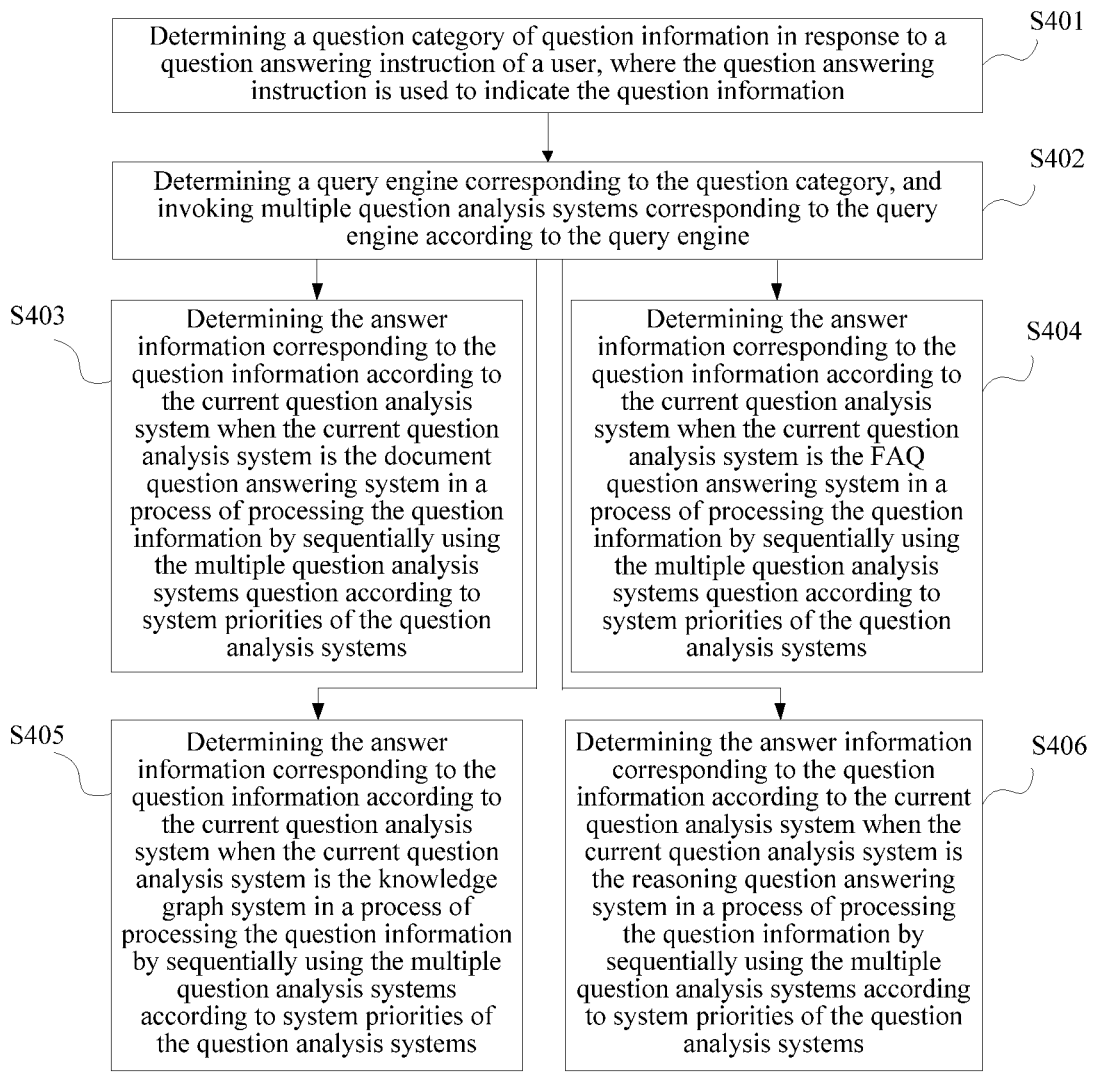
FIG. 4 is a schematic diagram according to a third embodiment of the present disclosure.

FIG. 4 is a schematic diagram according to a third embodiment of the present disclosure, the present disclosure provides a multi-system-based intelligent question answering method, which is to determine the answer information corresponding to the question information according to the different current question analysis system based on the above-mentioned embodiment, the method includes the following.

S401, determining a question category of question information in response to a question answering instruction of a user, where the question answering instruction is used to indicate the question information.

Exemplarily, for this step, reference may be made to step S201, which will not be repeated here.

S402, determining a query engine corresponding to the question category, and invoking multiple question analysis systems corresponding to the query engine according to the query engine.

Exemplarily, for this step, reference may be made to step S202, which will not be repeated here.

S403, determining the answer information corresponding to the question information according to the current question analysis system when the current question analysis system is the document question answering system in a process of processing the question information by sequentially using the multiple question analysis systems according to system priorities of the question analysis systems.

In an example, when the current question analysis system is the document question answering system, determining the answer information corresponding to the question information according to the current question analysis system includes:
    performing, according to a first database in the document question answering system, similarity matching on the question information to obtain an optimal paragraph corresponding to the question information, where the first database includes multiple documents, and the document has multiple paragraphs; and
    performing, according to a first enhanced representation through knowledge integration ERNIE model, a word count reduction processing on the optimal paragraph to obtain the answer information corresponding to the question information.

In this embodiment, the first database includes a document base and a proper noun base. After it is determined that the current question analysis system is the document question answering system, the similar content of the question information is determined in the first database. Specifically, the paragraph with the highest similarity can be determined as the corresponding optimal paragraph by performing similarity matching on the question information. For example, the first database includes different document types, which can be the news-type document content, question-and-answer search-type document content, and document material-type document content. By performing the similarity matching on the question information in the news-type document content, question-and-answer search-type document content, and document material-type document content, the optimal paragraph in the document with higher similarity can be determined, and the meaningless words in the optimal paragraph are deleted through the ERNIE (enhanced representation through knowledge integration) model, for example, words like "is", "do" and "of" can be deleted in the optimal paragraph, thus obtaining more concise answer information.

Further, the ERNIE model can be trained by the preset question information and the simplified answer information corresponding to the question information, so that the word count of the optimal paragraph can be reduced after the question information is inputted into the ERNIE model. The advantage of this setting is that the accuracy of the final answer information can be relatively high after adding the ERNIE model to the document question answering system.

In an example, performing, according to the first database in the document question answering system, the similarity matching on the question information to obtain the optimal paragraph corresponding to the question information includes:
    performing the similarity matching on the question information according to a first database in the document question answering system to obtain multiple candidate paragraphs similar to the question information, and obtaining core element information corresponding to the question information; and
    performing similarity calculation on the core element information and the candidate paragraph, and determining a candidate paragraph with a highest similarity as the optimal paragraph corresponding to the question information.

In this embodiment, the core element information includes one or more of the following: user location information, user attribute information, and information of a terminal device used by the user. The advantage of this setting is that the accuracy of the similarity of the candidate paragraphs can be improved by adding the content of the core element information.

In an example, multiple candidate paragraphs similar to the question information are determined in the first database, and the core element information in the question information is obtained after the multiple candidate paragraphs are determined, the core element information can be the user location information, the user attribute information, and the information of a terminal device used by the user. The user attribute information can be the information that describes the user's own characteristics, such as the user's name, the user's height, the user's age, and the user's preference.

In this embodiment, by calculating the similarity between the core element information and multiple candidate paragraphs, the candidate paragraph with the highest similarity is determined as the optimal paragraph. The advantage of this setting is that the optimal paragraph corresponding to the problem information can be quickly determined through the core element information and multiple candidate paragraphs, which can improve the accuracy of the optimal paragraph.

S404, determining the answer information corresponding to the question information according to the current question analysis system when the current question analysis system is the FAQ question answering system in a process of processing the question information by sequentially using the multiple question analysis systems according to system priorities of the question analysis systems.

In an example, when the current question analysis system is the FAQ question answering system, determining the answer information corresponding to the question information according to the current question analysis system includes:
    performing, according to a second database in the FAQ question answering system, similarity matching on the question information to obtain multiple question texts similar to the question information, where the second database includes multiple question texts; and determining the answer information corresponding to the question information according to the question information and the multiple question texts similar to the question information.

In an example, the second database includes the FAQ database and the proper noun database, multiple question texts that are similar to the question information are determined in the second database, and the answer information corresponding to the question information is jointly determined by the question information and the multiple question texts. For example, when the question information is "What is the age of A?", the similarity matching can be performed on the question information in the second database, and the multiple question texts that can be obtained are "When is A's birthday?" and "How old is A this year?", then the corresponding answer information is jointly determined according to the obtained question information and the multiple question texts. The advantage of this setting is that the generalization ability of the question information can be improved, thus making the feedback answer information more accurate.

In an example, determining the answer information corresponding to the question information according to the question information and the multiple question texts similar to the question information includes:

determining the question information and the multiple question texts similar to the question information as a candidate question in a question set, where the candidate question has feature information;

inputting the feature information of the candidate question in the question set into the preset neural network model to obtain an optimal candidate question; and determining, according to a correspondence between a preset candidate question and the answer information, the answer information corresponding to the optimal candidate question as the answer information corresponding to the question information.

In this embodiment, the question information and the multiple question texts are determined as the candidate question in the question set, where the candidate question has the same feature information, for example, the questions included in the candidate questions are: "What is the age of A?", "When is A's birthday?" and "How old is A this year?", the feature information in the above candidate questions is age, then the feature information of the acquired age is input into the neural network model to determine the optimal candidate question, and the answer information is determined according to the corresponding relationship between the optimal candidate question and the answer information, and the answer information is determined as the answer information corresponding to the question information. For example, when the optimal candidate question is "How old is A this year?", the obtained answer information is 27, and 27 is determined as the answer information for the question information "What is the age of A?". The advantage of this setting is that after the optimal candidate question is determined, the answer information corresponding to the optimal candidate question is directly determined as the final answer information, which can save the time for determining the answer information.

In an example, the generation process of the multiple question texts in the second database is as follows:

obtaining an original document, performing a segmentation processing on the original document to obtain multiple short texts, and performing an occlusion processing on the short text according to a second ERNIE model to generate the question text in the second database;

or, obtaining an original document, determining a title in the original document, and determining the title as the question text in the second database;

or, obtaining an original document, performing a content structure analysis processing on the original document to obtain a short segment with a questioning characteristic, and inputting the short segment and an original paragraph of the short segment in the original document into a preset model to obtain the question text in the second database, where the short segment is answer information corresponding to the obtained question text.

In this embodiment, the original document may be document data existing in various forms. After obtaining the original document, the original document is segmented, which can be segmented according to the semantic relationship. For example, the documents expressing the same semantics in the original document are segmented to obtain multiple short texts, an occlusion processing is performed on a part of the words in the short text to obtain multiple question texts according to the second ERNIE model. The technologies used are: paragraph recognition technology, answer paragraph recognition technology, question-and-answer paragraph matching technology, and noise reduction technology.

In this embodiment, after obtaining the original document, the title or subtitle of the original document is extracted, and the title or subtitle is modified into the form of a question, or the title is spliced and used as a question text.

In this embodiment, after obtaining the original document, the text content in the original document is analyzed, specifically, it can be a content structure analysis processing, extracting the connective word in the original document to obtain a short segment with a questioning characteristic, then inputting the short segment and the original paragraph where the short segment is located into the neural network model to determine the question text in the second database. The advantage of this setting is to provide as much question text from the second database as possible for the subsequent query of question information.

S405, determining the answer information corresponding to the question information according to the current question analysis system when the current question analysis system is the knowledge graph system in a process of processing the question information by sequentially using the multiple question analysis systems according to system priorities of the question analysis systems.

In an example, when the current question analysis system is the knowledge graph system, determining the answer information corresponding to the question information according to the current question analysis system includes:

extracting an entity in the question information; and identifying, according to a preset knowledge graph in the knowledge graph system and the third ERNIE model, the entity in the question information to obtain the answer information corresponding to the question information, where the preset knowledge graph includes multiple entities, there is a connection relationship between the entities in the preset knowledge graph, and the third ERNIE model is used to process the entity in the question information.

In an example, after the entity in the question information is extracted, the entity is determined in the preset knowledge graph through the preset knowledge graph in the knowledge graph system and the third ERNIE model, and the answer information related to the entity is determined. Further, the identification of the entity is realized through the third ERNIE model. The advantage of this setting is that by using the ERNIE model, the accuracy of the knowledge graph system in determining entities is improved.

In an example, identifying, according to the preset knowledge graph in the knowledge graph system and the third ERNIE model, the entity in the question information to obtain the answer information corresponding to the question information includes:

performing a masking processing on the entity in the question information according to the third ERNIE model to obtain multiple related entities;

inputting the entity in the question information and the obtained related entities into the preset knowledge graph to obtain multiple initial answers; and scoring the multiple initial answers according to the third ERNIE model to obtain the answer information corresponding to the question information.

In this embodiment, after performing the masking processing on the identified entity in the question information to determine the multiple related entities related to the entity, the entity and the related entity in the question information are input into the preset knowledge graph to determine multiple initial answers, then the multiple initial answers is scored through the third ERNIE model to obtain the answer information corresponding to the question information. The advantage of this setting is that the accuracy of the determined answer information can be improved.

In an example, when the current question analysis system is the knowledge graph system, determining the answer information corresponding to the question information according to the current question analysis system includes:

extracting a keyword in the question information, where the keyword has a word characteristic;

performing, according to a preset rule template base in the knowledge graph system and the word characteristic of the keyword in the question information, a matching processing on the question information to determine a rule template corresponding to the question information, where the rule template base includes multiple rule templates, and the rule template includes multiple slots without an order relationship, the slot represents a word characteristic, and the word characteristics of respective slots in the rule template are different; and performing, according to the rule template corresponding to the question information, answer matching on the question information to obtain the answer information corresponding to the question information.

In this embodiment, the keywords in the question information are extracted, where each word in the question information is a keyword, but the word characteristics to which the keywords belong are different, the word characteristics include entities, attributes, question words, stop words, connective words and jump words. The slots in this embodiment are positions where the keywords are placed, and different keywords are placed in different slots.

In this embodiment, the word characteristic contained in the keyword of the question information is determined according to the preset rule template base, and answer matching is performed on the question information in the rule template corresponding to the determined question information.

In this embodiment, the rule template base includes a rule for entity, attribute and question word, a rule for attribute, question word and connective word, and a rule for entity, jump word and attribute. For example, when the word characteristics contained in the question information are entity, attribute and question word, the question information is corresponded to the first rule in the rule template base, and the answer information corresponding to the question information is determined through the first rule. The advantage of this setting is that a rule template can be provided in advance to quickly locate the question information.

In an example, the rule template has a preset fine rule base, the fine rule base includes multiple fine rule tables corresponding to the rule template and the fine rule table includes multiple slots with an order relationship; and the word characteristics of respective slots in the fine rule table are different, or partial slots in the fine rule table have a same word characteristic.

The performing, according to the preset rule template base in the knowledge graph system and the word characteristic of the keyword in the question information, the matching processing on the question information to determine the rule template corresponding to the question information includes:

performing, according to the preset fine rule base of the fine rule base, a number of keywords with different word characteristic in the question information, and a connection relationship between the keywords with different word characteristic in the question information, the matching processing on the question information to determine a fine rule table corresponding to the question information; and filling the keyword in the question information into the fine rule table corresponding to the question information to obtain question description information, and determining, according to a correspondence between preset question description information and the answer information, the answer information corresponding to the obtained question description information as the answer information corresponding to the question information.

In this embodiment, the rule template includes multiple fine rule bases, the word characteristics of the multiple slots in each rule template are the same, but the multiple slots in the fine rule table in each rule template have an order relationship, for example, the first rule of the rule template is entity, attribute and question word, and the fine rules included in the fine rule base can be a rule for entity, attribute and question word, it can also include a rule for entity, attribute, entity and question word, and can also include a rule for entity, question word and attribute.

In this embodiment, after the number of keywords with different word characteristics in the question information and the connection relationship between the keywords with different word characteristics in the question information are determined, a matching processing is performed on the question information to determine the fine rule table corresponding to the question information, for example, the keyword in the question information is filled when the determined fine rule table is entity, attribute and question word at this time, and the corresponding answer information is determined by using the question information in the fine rule table. For example, the question information is "What is the age of A?", where "A" is the entity, "the" is the connective word, "age" is the attribute, "is" is the connective word and "how many" is the question word, then the rule template for entity, connective word, attribute and question word can be determined in the rule template base, in this rule template, the fine rule table for two connective words, one entity word, one attribute, and one question word is determined to obtain the question description information; further, the answer information corresponding to the obtained question description information is determined according to the correspondence between the preset question description information and the answer information, and the answer information is the answer information corresponding to the question information. The advantage of this setting is that the overall recall rate of answer information can be improved.

S406, determining the answer information corresponding to the question information according to the current question analysis system when the current question analysis system is the reasoning question answering system in a process of processing the question information by sequentially using the multiple question analysis systems according to system priorities of the question analysis systems.

In an example, when the current question analysis system is the reasoning question answering system, determining the answer information corresponding to the question information according to the current question analysis system includes:

extracting a keyword of the question information, where the keyword has a word characteristic;

performing, according to a preset reasoning rule template base in the reasoning question answering system, the word characteristic of the keyword in the question information, and an order relationship between the keywords in the question information, a matching processing on the question information to determine the reasoning template corresponding to the question information, where the reasoning rule template base includes multiple reasoning templates, and the reasoning template includes the multiple filling points with the order relationship, and the filling point has the word characteristic; and obtaining core element information corresponding to the question information, and determining the answer information corresponding to the question information according to the core element information corresponding to the question information and the reasoning template corresponding to the question information.

In this embodiment, the multiple filling points in the reasoning template have an order, in the case that the word characteristics of the filling points are the same, and the orders of the word characteristics of the filling points are different, the reasoning templates represented are different. The answer information corresponding to the question information is jointly determined by determining the core element information corresponding to the question information and the reasoning template corresponding to the question information. The advantage of this setting is that a wide range of question answering needs of users can be met.

In an example, determining the answer information corresponding to the question information according to the core element information corresponding to the question information and the reasoning template corresponding to the question information includes:

identifying, according to a preset neural network model, respective reasoning template corresponding to the question information to determine an optimal reasoning template; and determining the answer information corresponding to the question information according to the core element information corresponding to the question information and the optimal reasoning template.

In this embodiment, multiple reasoning templates are inputted into the preset neural network model, after the optimal reasoning template is determined via the preset neural network model, then the core element information corresponding to the question information is obtained, and the answer information corresponding to the question information is jointly determined by combining the above two. The advantage of this setting is that the robustness of the answer information can be improved.

In an example, determining the answer information corresponding to the question information according to the core element information corresponding to the question information and the optimal reasoning template includes:

determining a word characteristic of the core element information, and obtaining a filling point corresponding to the word characteristic of the core element information;

adding the filling point corresponding to the word characteristic of the core element information into the optimal reasoning template to obtain a final reasoning template;

filling the keyword of the question information and the core element information corresponding to the question information into respective filling point of the final reasoning template to obtain a reasoning statement; and determining, according to a correspondence between a preset reasoning statement and the answer information, answer information corresponding to the obtained reasoning statement as the answer information corresponding to the question information.

In this embodiment, the acquired word characteristic of the obtained core element information is filled into the filling point, and the core element information is added to the optimal reasoning template, for example, the core element information can be the geographic location information, then the geographic location information is filled into the filling point of the entity, and the final reasoning template is jointly determined according to the filling point of the entity. After obtaining the keyword in the question information, the keyword is also filled into the filling point, and the reasoning sentence is obtained according to the final reasoning template.

After the reasoning sentence is obtained, the final answer information is determined according to the relationship between the preset reasoning sentence and the answer information. The advantage of this setting is that accurate answer information can be determined through the reasoning sentence, and the efficiency of the answer information determination is improved.

In an embodiment, the method further comprises: feeding back the answer information to the user.

The present disclosure provides a multi-system-based intelligent question answering method, the answer information corresponding to the question information is determined according to the difference of the current question analysis system, there are multiple current question analysis systems, and these systems can be combined arbitrarily to determine the answer information corresponding to the question information. By adopting the technical solution, the answer information can be quickly found in a large number of professional enterprise documents.

Figure 5:
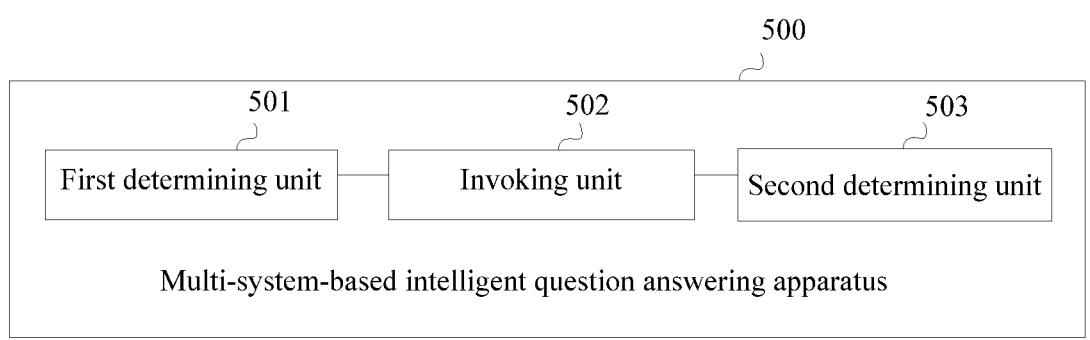
FIG. 5 is a schematic diagram according to a fourth embodiment of the present disclosure.

FIG. 5 is a schematic diagram according to the fourth embodiment of the present disclosure. The present disclosure provides a multi-system-based intelligent question answering apparatus 500, including:

a first determining unit 501, configured to determine a question category of question information in response to a question answering instruction of a user, where the question answering instruction is used to indicate the question information;

an invoking unit 502, configured to determine a query engine corresponding to the question category, and invoke multiple question analysis systems corresponding to the query engine according to the query engine;

a second determining unit 503, configured to feed back answer information to the user when the answer information corresponding to the question information is determined according to a current question analysis system in a process of processing the question information by sequentially using the multiple question analysis systems according to system priorities of the question analysis systems.

Those skilled in the art can clearly understand that, for the convenience and succinctness of description, the specific working process of the above-described apparatus can be referred to the corresponding process in the foregoing method embodiment, and will not be repeated here.

Figure 6:
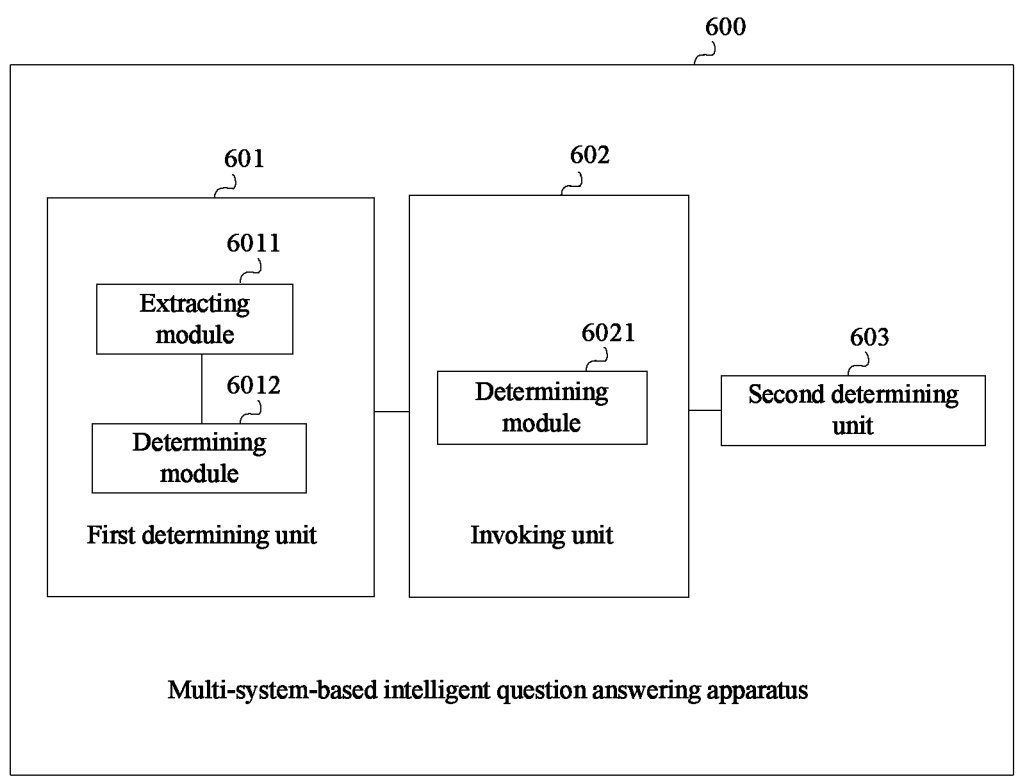
FIG. 6 is a schematic diagram according to a fifth embodiment of the present disclosure.

FIG. 6 is a schematic diagram according to a fifth embodiment of the present disclosure, the present disclosure provides a multi-system-based intelligent question answering apparatus 600, including:

a first determining unit 601, configured to determine a question category of question information in response to a question answering instruction of a user, where the question answering instruction is used to indicate the question information;

an invoking unit 602, configured to determine a query engine corresponding to the question category, and invoke multiple question analysis systems corresponding to the query engine according to the query engine; and a second determining unit 603, configured to feed back answer information to the user when the answer information corresponding to the question information is determined according to a current question analysis system in a process of processing the question information by sequentially using the multiple question analysis systems according to system priorities of the question analysis systems.

In an example, the multiple question analysis systems include: a knowledge graph system, a reasoning question answering system, a document question answering system, and a frequently-asked questions FAQ question answering system.

The knowledge graph system is used to indicate answer information corresponding to an entity in the question information.

The reasoning question answering system is used to indicate a reasoning template corresponding to the question information, where the reasoning template is used to determine the answer information, the reasoning template includes multiple filling points with an order relationship, and the filling point has a word characteristic.

The document question answering system is used to indicate a paragraph corresponding to the question information, where the paragraph is used to determine the answer information.

The FAQ question answering system is used to indicate a further question related to the question information, where the further question and the question information are used to determine the answer information.

In one example, the system priority is preset; or the system priority is confirmed by the user; or the system priority represents an amount of data contained in the question analysis system.

In one example, the first determining unit 601 includes:

an extracting module 6011, configured to extract key information of the question information, where the key information includes an entity word and/or a modal word; and a determining module 6012, configured to determine the question category of the question information according to a correspondence between preset key information and the question category.

In one example, the invoking unit 602 includes:

a determining module 6021, configured to determine the query engine corresponding to the question category according to a preset mapping relationship between the question category and the query engine;

the question category is one of the following: a number category, a short text category, a long text category, a general demand category and a judgment category.

Those skilled in the art can clearly understand that, for the convenience and succinctness of description, the specific working process of the above-described apparatus can be referred to the corresponding process in the foregoing method embodiment, and will not be repeated here.

Figure 7:
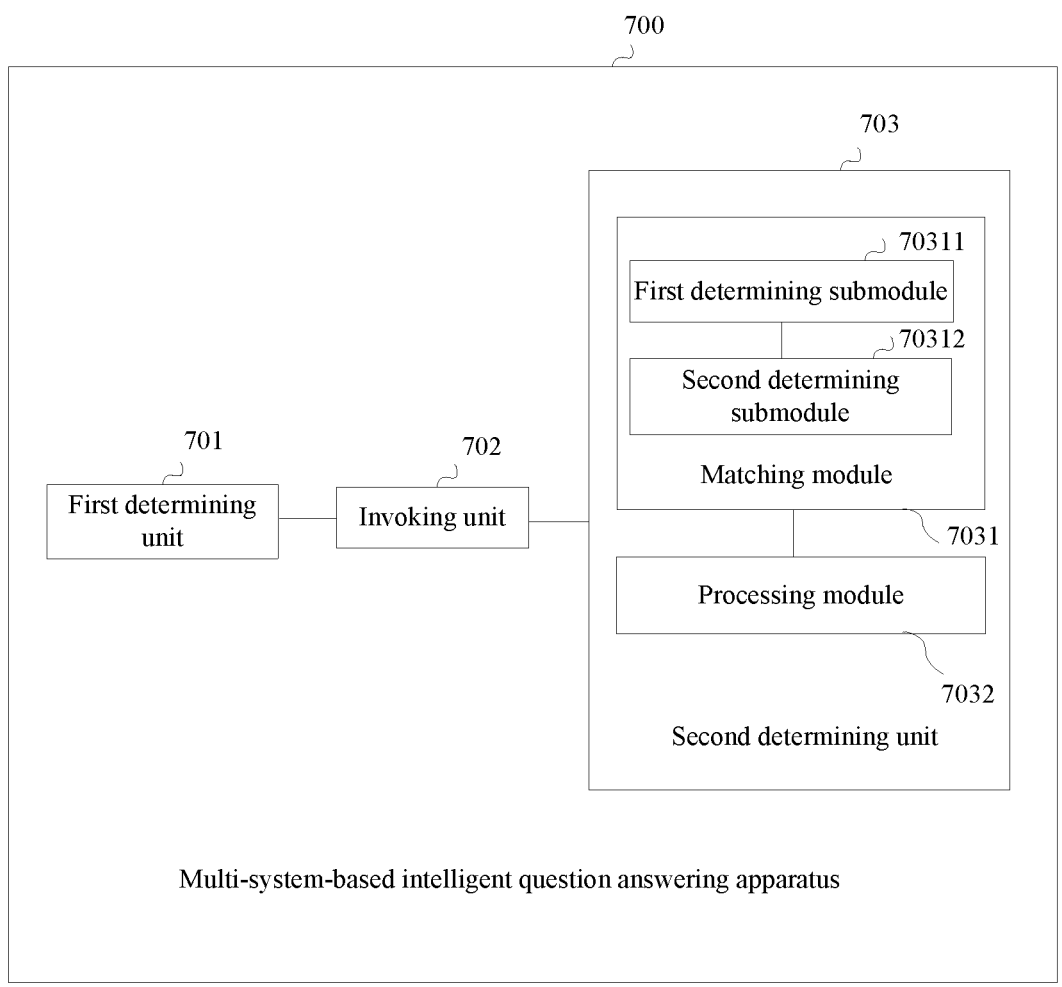
FIG. 7 is a schematic diagram according to a sixth embodiment of the present disclosure.

FIG. 7 is a schematic diagram according to a sixth embodiment of the present disclosure, the present disclosure provides a multi-system-based intelligent question answering device 700, including:

a first determining unit 701, configured to determine a question category of question information in response to a question answering instruction of a user, where the question answering instruction is used to indicate the question information.

an invoking unit 702, configured to determine a query engine corresponding to the question category, and invoke multiple question analysis systems corresponding to the query engine according to the query engine; and a second determining unit 703, configured to feed back answer information to the user when the answer information corresponding to the question information is determined according to a current question analysis system in a process of processing the question information by sequentially using the multiple question analysis systems according to system priorities of the question analysis systems.

In an example, when the current question analysis system is the document question answering system, the second determining unit 703 includes:

a matching module 7031, configured to perform, according to a first database in the document question answering system, similarity matching on the question information to obtain an optimal paragraph corresponding to the question information, where the first database includes multiple documents, and the document has multiple paragraphs;

a processing module 7032, configured to perform, according to a first enhanced representation through knowledge integration ERNIE model, a word count reduction processing on the optimal paragraph to obtain the answer information corresponding to the question information.

In one example, the matching module 7031 includes:

a first determining submodule 70311, configured to perform the similarity matching on the question information according to a first database in the document question answering system to obtain multiple candidate paragraphs similar to the question information, and obtain core element information corresponding to the question information;

a second determining submodule 70312, configured to perform similarity calculation on the core element information and the candidate paragraph, and determine a candidate paragraph with a highest similarity as the optimal paragraph corresponding to the question information.

In an example, the core element information includes one or more of the following: user location information, user attribute information, and information of a terminal device used by the user.

Those skilled in the art can clearly understand that, for the convenience and succinctness of description, the specific working process of the above-described apparatus can be referred to the corresponding process in the foregoing method embodiment, and will not be repeated here.

Figure 8:
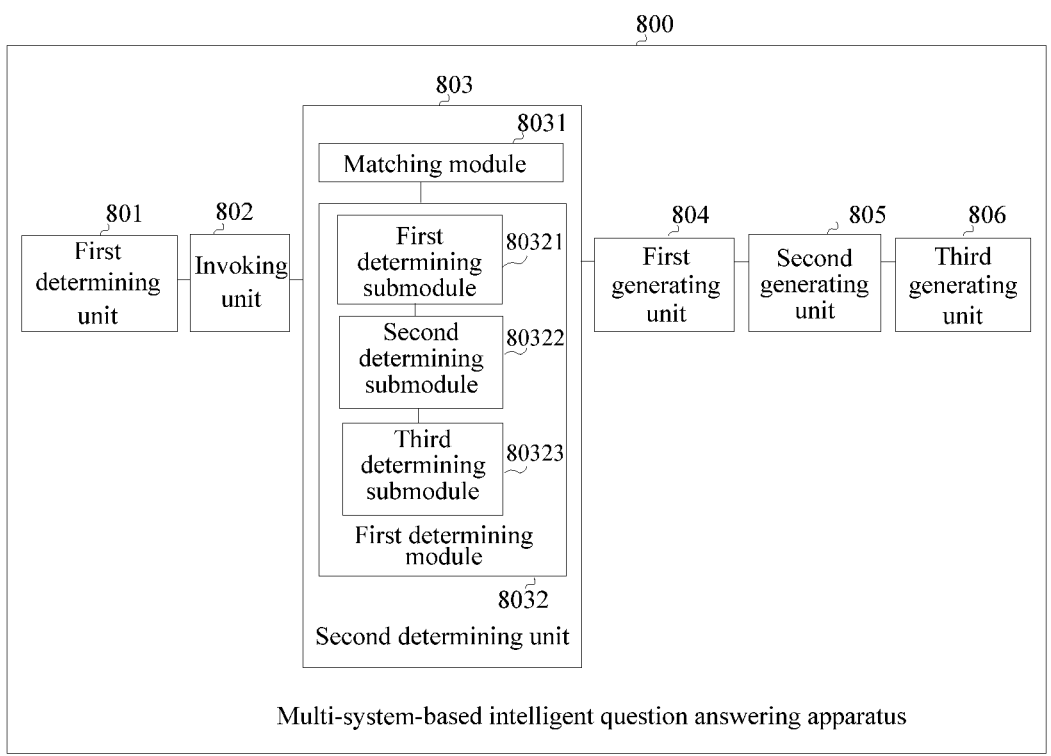
FIG. 8 is a schematic diagram according to a seventh embodiment of the present disclosure.

FIG. 8 is a schematic diagram according to a seventh embodiment of the present disclosure, the present disclosure provides a multi-system-based intelligent question answering device 800, including:

a first determining unit 801, configured to determine a question category of question information in response to a question answering instruction of a user, where the question answering instruction is used to indicate the question information;

an invoking unit 802, configured to determine a query engine corresponding to the question category, and invoke multiple question analysis systems corresponding to the query engine according to the query engine; and a second determining unit 803, configured to feed back answer information to the user when the answer information corresponding to the question information is determined according to a current question analysis system in a process of processing the question information by sequentially using the multiple question analysis systems according to system priorities of the question analysis systems.

In an example, when the current question analysis system is a FAQ question answering system, the second determining unit 803 includes:

a matching module 8031, configured to perform, according to a second database in the FAQ question answering system, similarity matching on the question information to obtain multiple question texts similar to the question information, where the second database includes multiple question texts; and a first determining module 8032, configured to determine the answer information corresponding to the question information according to the question information and the multiple question texts similar to the question information.

In an example, the first determining module 8032 includes:

a first determining submodule 80321, configured to determine the question information and the multiple question texts similar to the question information as a candidate question in a question set, where the candidate question has feature information;

a second determining submodule 80322, configured to input the feature information of the candidate question in the question set into the preset neural network model to obtain an optimal candidate question; and a third determining submodule 80323, configured to determine, according to a correspondence between a preset candidate question and the answer information, the answer information corresponding to the optimal candidate question as the answer information corresponding to the question information.

In an example, further including:

a first generating unit 804, configured to obtain an original document, perform a segmentation processing on the original document to obtain multiple short texts, and perform an occlusion processing on the short text according to a second ERNIE model to generate the question text in the second database;

or, a second generating unit 805, configured to obtain an original document, determine a title in the original document, and determine the title as the question text in the second database;

or, a third generating unit 806, configured to obtain an original document, perform a content structure analysis processing on the original document to obtain a short segment with a questioning characteristic, and input the short segment and an original paragraph of the short segment in the original document into a preset model to obtain the question text in the second database, where the short segment is answer information corresponding to the obtained question text.

Those skilled in the art can clearly understand that, for the convenience and succinctness of description, the specific working process of the above-described apparatus can be referred to the corresponding process in the foregoing method embodiment, and will not be repeated here.

Figure 9:
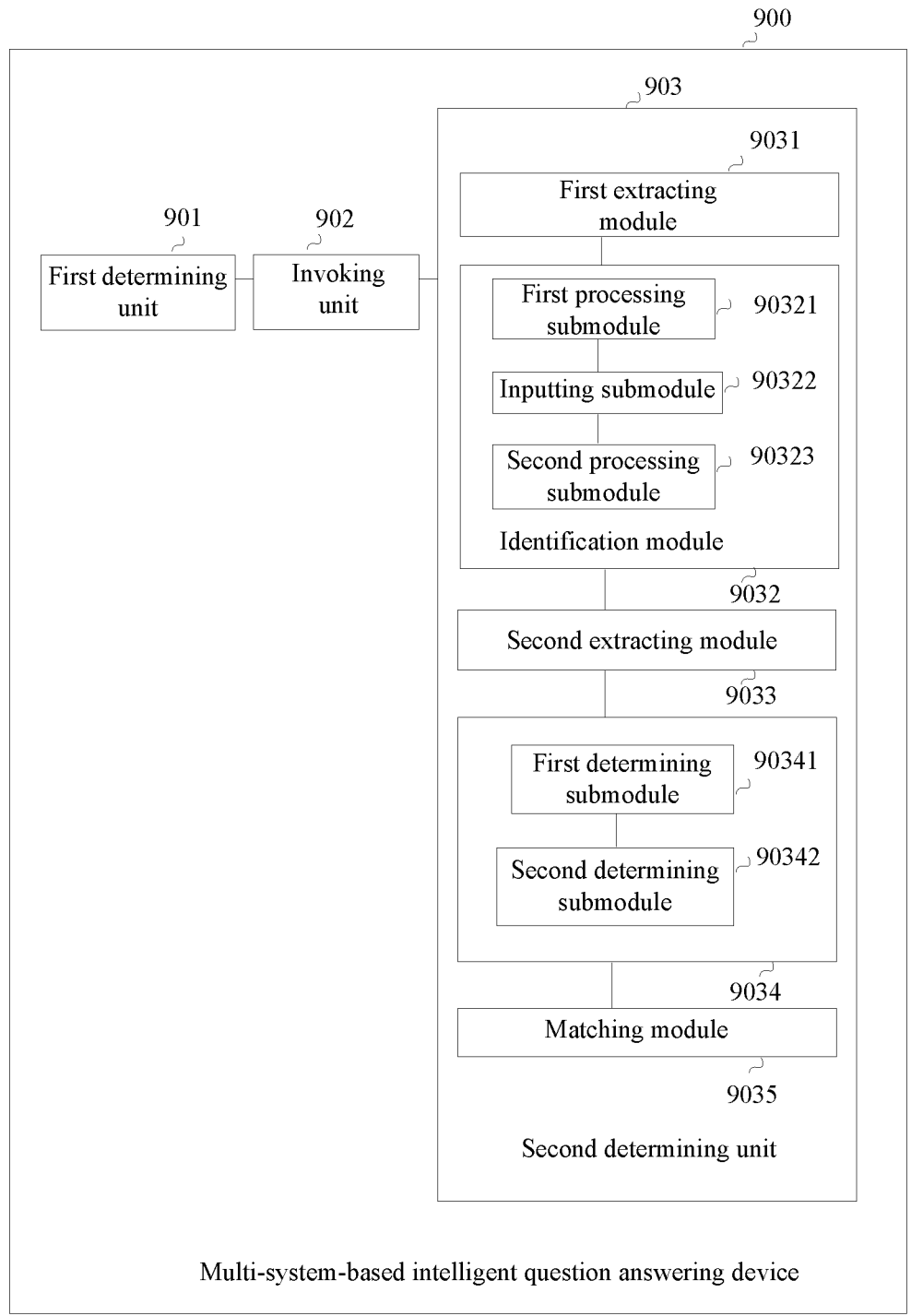
FIG. 9 is a schematic diagram according to an eighth embodiment of the present disclosure.

FIG. 9 is a schematic diagram according to an eighth embodiment of the present disclosure, the present disclosure provides a multi-system-based intelligent question answering device 900, including:

a first determining unit 901, configured to determine a question category of question information in response to a question answering instruction of a user, where the question answering instruction is used to indicate the question information;

an invoking unit 902, configured to determine a query engine corresponding to the question category, and invoke multiple question analysis systems corresponding to the query engine according to the query engine; and a second determining unit 903, configured to feed back answer information to the user when the answer information corresponding to the question information is determined according to a current question analysis system in a process of processing the question information by sequentially using the multiple question analysis systems according to system priorities of the question analysis systems.

In an example, when the current question analysis system is the knowledge graph system, the second determining unit 903 includes:

a first extracting module 9031, configured to extract an entity in the question information; and an identification module 9032, configured to identify, according to a preset knowledge graph in the knowledge graph system and the third ERNIE model, the entity in the question information to obtain the answer information corresponding to the question information, where the preset knowledge graph includes multiple entities, there is a connection relationship between the entities in the preset knowledge graph, and the third ERNIE model is used to process the entity in the question information.

In an example, the identification module 9032 includes:
- a first processing submodule 90321, configured to perform a masking processing on the entity in the question information according to the third ERNIE model to obtain multiple related entities;
- an inputting submodule 90322, configured to input the entity in the question information and the obtained related entities into the preset knowledge graph to obtain multiple initial answers; and
- a second processing submodule 90323, configured to score the multiple initial answers according to the third ERNIE model to obtain the answer information corresponding to the question information.

In an example, when the current question analysis system is the knowledge graph system, the second determining unit 903 includes:
- a second extracting module 9033, configured to extract a keyword in the question information, where the keyword has a word characteristic;
- a processing module 9034, configured to perform, according to a preset rule template base in the knowledge graph system and the word characteristic of the keyword in the question information, a matching processing on the question information to determine a rule template corresponding to the question information, where the rule template base includes multiple rule templates, and the rule template includes multiple slots without an order relationship, the slot represents a word characteristic, and the word characteristics of respective slots in the rule template are different; and
- a matching module 9035, configured to perform, according to the rule template corresponding to the question information, answer matching on the question information to obtain the answer information corresponding to the question information.

In an example, the rule template has a preset fine rule base, the fine rule base includes multiple fine rule tables corresponding to the rule template and the fine rule table includes multiple slots with an order relationship; and the word characteristics of respective slots in the fine rule table are different, or partial slots in the fine rule table have a same word characteristic;

the processing module 9034 includes:
- a first determining submodule 90341, configured to perform, according to the preset fine rule base of the fine rule base, a number of keywords with different word characteristic in the question information, and a connection relationship between the keywords with different word characteristic in the question information, the matching processing on the question information to determine a fine rule table corresponding to the question information; and
- a second determining submodule 90342, configured to fill the keyword in the question information into the fine rule table corresponding to the question information to obtain question description information, and determine, according to a correspondence between preset question description information and the answer information, the answer information corresponding to the obtained question description information as the answer information corresponding to the question information.

Those skilled in the art can clearly understand that, for the convenience and succinctness of description, the specific working process of the above-described apparatus can be referred to the corresponding process in the foregoing method embodiment, and will not be repeated here.

Figure 10:
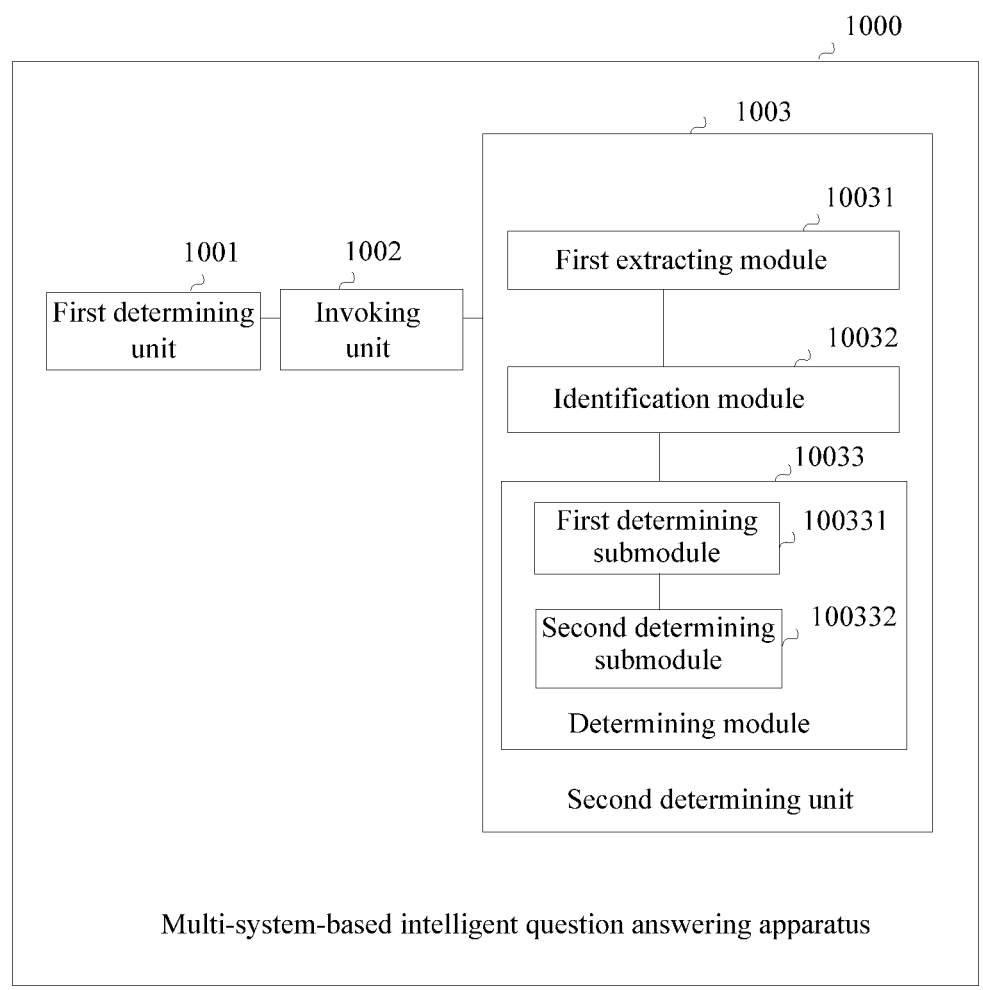
FIG. 10 is a schematic diagram according to a ninth embodiment of the present disclosure.

FIG. 10 is a schematic diagram according to a ninth embodiment of the present disclosure, the present disclosure provides a multi-system-based intelligent question answering device 1000, including:
- a first determining unit 1001, configured to determine a question category of question information in response to a question answering instruction of a user, where the question answering instruction is used to indicate the question information;
- an invoking unit 1002, configured to determine a query engine corresponding to the question category, and invoke multiple question analysis systems corresponding to the query engine according to the query engine; and
- a second determining unit 1003, configured to feed back answer information to the user when the answer information corresponding to the question information is determined according to a current question analysis system in a process of processing the question information by sequentially using the multiple question analysis systems according to system priorities of the question analysis systems.

In an example, when the current question analysis system is the reasoning question answering system, the second determining unit 1003 includes:
- an extracting module 10031, configured to extract a keyword of the question information, where the keyword has a word characteristic;
- a processing module 10032, configured to perform, according to a preset reasoning rule template base in the reasoning question answering system, the word characteristic of the keyword in the question information, and an order relationship between the keywords in the question information, a matching processing on the question information to determine the reasoning template corresponding to the question information, where the reasoning rule template base includes multiple reasoning templates, and the reasoning template includes the multiple filling points with the order relationship, and the filling point has the word characteristic; and
- a determining module 10033, configured to obtain core element information corresponding to the question information, and determine the answer information corresponding to the question information according to the core element information corresponding to the question information and the reasoning template corresponding to the question information.

In an example, the determining module 10033 includes:
- a first determining submodule 100331, configured to identify, according to a preset neural network model, respective reasoning template corresponding to the question information to determine an optimal reasoning template; and
- a second determining submodule 100332, configured to determine the answer information corresponding to the question information according to the core element information corresponding to the question information and the optimal reasoning template.

In an example, the second determining submodule 100332 is further configured to:
- determine a word characteristic of the core element information, and obtain a filling point corresponding to the word characteristic of the core element information;

add the filling point corresponding to the word characteristic of the core element information into the optimal reasoning template to obtain a final reasoning template;

fill the keyword of the question information and the core element information corresponding to the question information into respective filling point of the final reasoning template to obtain a reasoning statement; and determine, according to a correspondence between a preset reasoning statement and the answer information, answer information corresponding to the obtained reasoning statement as the answer information corresponding to the question information.

Those skilled in the art can clearly understand that, for the convenience and succinctness of description, the specific working process of the above-described apparatus can be referred to the corresponding process in the foregoing method embodiment, and will not be repeated here.

In the technical solutions of the present disclosure, the collection, storage, usage, processing, transmission, provision, publication and other applications of a user's personal information are in compliance with the provisions of relevant laws and regulations, and do not violate public order and moral.

According to embodiments of the present disclosure, the present disclosure also provides an electronic device, a readable storage medium, and a computer program product.

According to an embodiment of the present disclosure, the present disclosure also provides a computer program product, where the computer program product includes a computer program stored in a readable storage medium, at least one processor of an electronic device may read the computer program from the readable medium storage, and the at least one processor executes the computer program to enable the electronic device to execute the solution provided in any one of the aforementioned embodiments.

Figure 11:
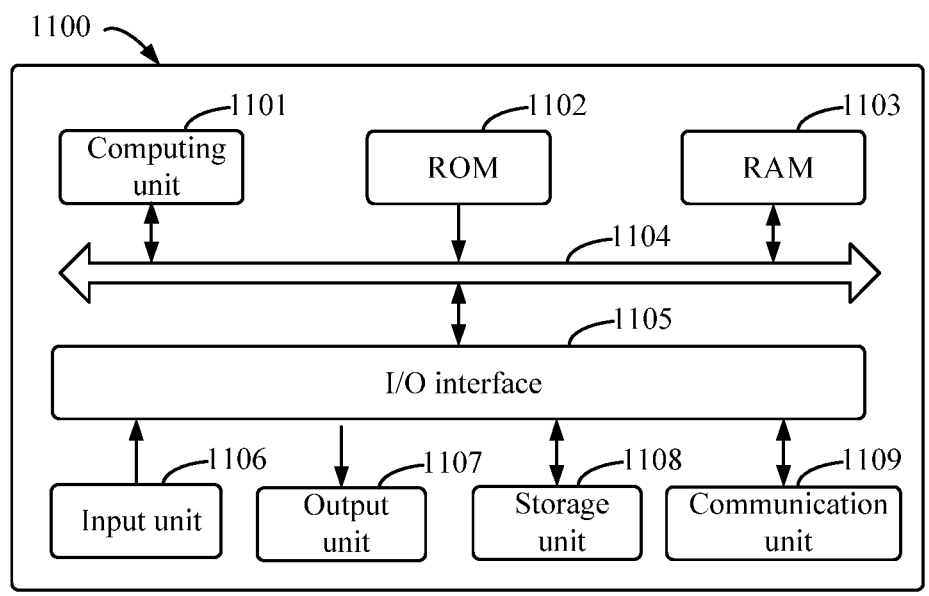
FIG. 11 is a block diagram of an electronic device for implementing the multi-system-based intelligent question answering method according to an embodiment of the present disclosure.

FIG. 11 shows a schematic block diagram illustrating an exemplary electronic device 1100 which can be used to implement an embodiment of the present disclosure. The electronic device is intended to represent various forms of digital computers, such as a laptop computer, a desktop computer, a workstation, a personal digital assistant, a server, a blade server, a mainframe computer and other suitable computers. The electronic device may also represent various forms of mobile apparatuses, such as a personal digital assistant, a cellular phone, a smart phone, a wearable device and other similar computing apparatuses. The components shown herein, their connections and relationships, and their functions are merely exemplary, and are not intended to limit the implementations of the present disclosure described and/or claimed herein.

As shown in FIG. 11, the device 1100 includes a computing unit 1101, which may perform various appropriate actions and processes according to a computer program stored in a read-only memory (ROM) 1102 or a computer program loaded from a storage unit 1108 to a random access memory (RAM) 1103. In the RAM 1103, various programs and data required for operations of the device 1100 may also be stored. The computing unit 1101, the ROM 1102 and the RAM 1103 are connected to each other through a bus 1104. An input/output (I/O) interface 1105 is also connected to the bus 1104.

Multiple components in the device 1100 are connected to the I/O interface 1105, and include: an input unit 1106, such as a keyboard, a mouse, etc.; an output unit 1107, such as various types of displays, speakers, etc.; the storage unit 1108, such as a magnetic disk, an optical disc, etc.; and a communication unit 1109, such as a network card, a modem, a wireless communication transceiver, etc. The communication unit 1109 allows the device 1100 to exchange information/data with other devices over a computer network such as Internet and/or various telecommunication networks.

The computing unit 1101 may be various general-purpose and/or special-purpose processing components with processing and computing capabilities. Some examples of the computing unit 1101 include, but are not limited to, central processing units (CPU), graphic processing units (GPU), various dedicated artificial intelligence (AI) computing chips, various computing units that run machine learning model algorithms, digital signal processors (DSP), and also any appropriate processors, controllers, microcontrollers, etc. The computing unit 1101 executes each method and process described above, e.g., a multi-system-based intelligent question answering method. For example, in some embodiments, the multi-system-based intelligent question answering method can be implemented as computer software programs, which are tangibly contained in a machine-readable medium, such as the storage unit 1108. In some embodiments, part or entirety of the computer program may be loaded and/or installed into the device 1100 via the ROM 1102 and/or the communication unit 1109. When the computer program is loaded into the RAM 1103 and executed by the computing unit 1101, one or more steps of the multi-system-based intelligent question answering method as described above may be executed. Alternatively, in other embodiments, the computing unit 1101 may be configured to execute the multi-system-based intelligent question answering method, in any other suitable manner (for example, by means of firmware).

Various implementations of the system and technology described above herein may be implemented in digital electronic circuit systems, integrated circuit systems, field programmable gate arrays (FPGA), application specific integrated circuits (ASIC), application specific standard parts (ASSP), system-on-chips (SOC), complex programmable logic devices (CPLD), computer hardware, firmware, software, and/or a combination thereof. These various implementations may include: being implemented in one or more computer programs, where the one or more computer programs may be executed and/or interpreted on a programmable system including at least one programmable processor. The programmable processor may be a special-purpose or general-purpose programmable processor, can receive data and instructions from a storage system, at least one input apparatus and at least one output apparatus, and transmit the data and instructions to the storage system, the at least one input apparatus and the at least one output apparatus.

Program codes for implementing a method of the present disclosure can be written in one programming language or any combination of multiple programming languages. These program codes can be provided to a processor or a controller of a general-purpose computer, a special-purpose computer, or other programmable data processing apparatus, so that functions/operations specified in flowcharts and/or block diagrams are implemented when the program codes are executed by the processor or the controller. The program codes may be executed entirely on a machine, partly on a machine, partly executed on a machine and partly executed on a remote machine as an independent software package, or entirely executed on a remote machine or a server.

In the context of the present disclosure, the machine-readable medium may be a tangible medium, which may contain or store a program for an instruction execution system, apparatus, or device to use or to be used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductive system, apparatus, or device, or any suitable combination of the foregoing. More specific examples of the machine-readable storage medium would include an electrically connected portable computer disk based on one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In order to provide interaction with users, the system and technology described herein can be implemented on a computer, where the computer has: a display apparatus for displaying information to users (for example, a CRT (cathode ray tube) or LCD (liquid crystal display) monitor); and a keyboard and a pointing apparatus (for example, a mouse or a trackball) through which the users can provide input to the computer. Other kinds of apparatuses can also be used to provide interaction with the users; for example, a feedback provided to the users may be any form of sensory feedback (for example, visual feedback, auditory feedback, or tactile feedback); and input from the users can be received in any form (including acoustic input, voice input, or tactile input).

The system and technology described herein can be implemented in a computing system that includes background components (for example, as a data server), or a computing system that includes middleware components (for example, an application server), or a computing system that includes front-end components (for example, a user computer with a graphical user interface or a web browser through which the user can interact with implementations of the system and technology described herein), or a computing system that includes any combination of such background components, middleware components or front-end components. The components of the system can be connected to each other through digital data communication in any form or medium (for example, a communication network). Examples of the communication network include: a local area network (LAN), a wide area network (WAN) and the Internet.

The computing system may include a client and a server. The client and server are generally far away from each other and usually interact through a communication network. A relationship between the client and the server is generated through computer programs running on corresponding computers and having a client-server relationship with each other.

It should be understood that various forms of processes shown above may be used to reorder, add or delete steps. For example, the steps described in the present disclosure may be executed in parallel, sequentially or in a different order, as long as a desired result of the technical solution disclosed in the present disclosure can be achieved, and there is no limitation herein.

The aforementioned specific implementations do not constitute a limitation to the protection scope of the present disclosure. Persons skilled in the art should understand that various modifications, combinations, sub-combinations and substitutions may be made according to design requirements and other factors. Any modification, equivalent replacement and improvement, etc. made within the spirit and principle of the present disclosure shall be included in the protection scope of the present disclosure.

What is claimed is:

1. A multi-system-based intelligent question answering method applied in intelligent technology and natural language technology, applied to a server that interacts with a client through digital data communication, comprising:
   receiving a question answering instruction sent by the client, wherein the question answering instruction is triggered by a user through the client;
   determining a question category of question information in response to the question answering instruction, wherein the question answering instruction is used to indicate the question information;
   determining a query engine corresponding to the question category, and invoking multiple question analysis systems corresponding to the query engine according to the query engine; and
   sending answer information to the client when the answer information corresponding to the question information is determined according to a current question analysis system in a process of processing the question information by sequentially using the multiple question analysis systems according to system priorities of the question analysis systems, when the answer information corresponding to the question information is not determined according to the current question analysis system, a next question analysis system determined according to the system priorities of the question analysis systems is used to process the question information;
   wherein the query engine is used for providing users with comprehensive information services based on preset algorithms;
   wherein the multiple question analysis systems comprise: a knowledge graph system, a reasoning question answering system, a document question answering system, and a frequently-asked questions (FAQ) question answering system;
   wherein the knowledge graph system is used to indicate answer information corresponding to an entity in the question information;
   the reasoning question answering system is used to indicate a reasoning template corresponding to the question information, wherein the reasoning template is used to determine the answer information, the reasoning template comprises multiple filling points with an order relationship, and the filling point has a word characteristic;
   the document question answering system is used to indicate a paragraph corresponding to the question information, wherein the paragraph is used to determine the answer information; and
   the FAQ question answering system is used to indicate a further question related to the question information, wherein the further question and the question information are used to determine the answer information.

2. The method according to claim 1, wherein when the current question analysis system is the document question answering system, determining the answer information corresponding to the question information according to the current question analysis system comprises:
   performing according to a first database in the document question answering system, similarity matching on the question information to obtain an optimal paragraph corresponding to the question information, wherein the first database comprises multiple documents, and the document has multiple paragraphs; and performing according to a first enhanced representation through knowledge integration ERNIE) model, a word count reduction processing on the optimal paragraph to obtain the answer information corresponding to the question information.

3. The method according to claim 2, wherein performing according to the first database in the document question answering system, the similarity matching on the question information to obtain the optimal paragraph corresponding to the question information comprises:
performing the similarity matching on the question information according to a first database in the document question answering system to obtain multiple candidate paragraphs similar to the question information, and obtaining core element information corresponding to the question information; and
performing similarity calculation on the core element information and the candidate paragraph, and determining a candidate paragraph with a highest similarity as the optimal paragraph corresponding to the question information.

4. The method according to claim 3, wherein the core element information comprises one or more of the following: user location information, user attribute information, and information of a terminal device used by the user.

5. The method according to claim 1, wherein when the current question analysis system is the FAQ question answering system, determining the answer information corresponding to the question information according to the current question analysis system comprises:
performing according to a second database in the FAQ question answering system, similarity matching on the question information to obtain multiple question texts similar to the question information, wherein the second database comprises multiple question texts; and
determining the answer information corresponding to the question information according to the question information and the multiple question texts similar to the question information.

6. The method according to claim 5, wherein determining the answer information corresponding to the question information according to the question information and the multiple question texts similar to the question information comprises:
determining the question information and the multiple question texts similar to the question information as a candidate question in a question set, wherein the candidate question has feature information;
inputting the feature information of the candidate question in the question set into the preset neural network model to obtain an optimal candidate question; and
determining according to a correspondence between a preset candidate question and the answer information, the answer information corresponding to the optimal candidate question as the answer information corresponding to the question information.

7. The method according to claim 5, further comprising:
obtaining an original document, performing a segmentation processing on the original document to obtain multiple short texts, and performing an occlusion processing on the short text according to a second ERNIE model to generate the question text in the second database;
or, obtaining an original document, determining a title in the original document, and determining the title as the question text in the second database;
or, obtaining an original document, performing a content structure analysis processing on the original document to obtain a short segment with a questioning characteristic, and inputting the short segment and an original paragraph of the short segment in the original document into a preset model to obtain the question text in the second database, wherein the short segment is answer information corresponding to the obtained question text.

8. The method according to claim 1, wherein when the current question analysis system is the knowledge graph system, determining the answer information corresponding to the question information according to the current question analysis system comprises:
extracting an entity in the question information; and
identifying according to a preset knowledge graph in the knowledge graph system and the third ERNIE model, the entity in the question information to obtain the answer information corresponding to the question information, wherein the preset knowledge graph comprises multiple entities, there is a connection relationship between the entities in the preset knowledge graph, and the third ERNIE model is used to process the entity in the question information.

9. The method according to claim 8, wherein identifying according to the preset knowledge graph in the knowledge graph system and the third ERNIE model, the entity in the question information to obtain the answer information corresponding to the question information comprises:
performing a masking processing on the entity in the question information according to the third ERNIE model to obtain multiple related entities;
inputting the entity in the question information and the obtained related entities into the preset knowledge graph to obtain multiple initial answers; and
scoring the multiple initial answers according to the third ERNIE model to obtain the answer information corresponding to the question information.

10. The method according to claim 1, wherein when the current question analysis system is the knowledge graph system, determining the answer information corresponding to the question information according to the current question analysis system comprises:
extracting a keyword in the question information, wherein the keyword has a word characteristic;
performing according to a preset rule template base in the knowledge graph system and the word characteristic of the keyword in the question information, a matching processing on the question information to determine a rule template corresponding to the question information, wherein the rule template base comprises multiple rule templates, and the rule template comprises multiple slots without an order relationship, the slot represents a word characteristic, and the word characteristics of respective slots in the rule template are different; and
performing according to the rule template corresponding to the question information, answer matching on the question information to obtain the answer information corresponding to the question information.

11. The method according to claim 10, wherein the rule template has a preset fine rule base, the fine rule base comprises multiple fine rule tables corresponding to the rule template and the fine rule table comprises multiple slots with an order relationship; and the word characteristics of respective slots in the fine rule table are different, or partial slots in the fine rule table have a same word characteristic;

performing according to the preset rule template base in the knowledge graph system and the word characteristic of the keyword in the question information, the matching processing on the question information to determine the rule template corresponding to the question information comprises:
performing according to the preset fine rule base of the fine rule base, a number of keywords with different word characteristic in the question information, and a connection relationship between the keywords with different word characteristic in the question information, the matching processing on the question information to determine a fine rule table corresponding to the question information; and
filling the keyword in the question information into the fine rule table corresponding to the question information to obtain question description information, and determining according to a correspondence between preset question description information and the answer information, the answer information corresponding to the obtained question description information as the answer information corresponding to the question information.

12. The method according to claim 1, wherein when the current question analysis system is the reasoning question answering system, determining the answer information corresponding to the question information according to the current question analysis system comprises:
extracting a keyword of the question information, wherein the keyword has a word characteristic;
performing according to a preset reasoning rule template base in the reasoning question answering system, the word characteristic of the keyword in the question information, and an order relationship between the keywords in the question information, a matching processing on the question information to determine the reasoning template corresponding to the question information, wherein the reasoning rule template base comprises multiple reasoning templates, and the reasoning template comprises the multiple filling points with the order relationship, and the filling point has the word characteristic; and
obtaining core element information corresponding to the question information, and determining the answer information corresponding to the question information according to the core element information corresponding to the question information and the reasoning template corresponding to the question information.

13. The method according to claim 12, wherein determining the answer information corresponding to the question information according to the core element information corresponding to the question information and the reasoning template corresponding to the question information comprises:
identifying according to a preset neural network model, respective reasoning template corresponding to the question information to determine an optimal reasoning template; and
determining the answer information corresponding to the question information according to the core element information corresponding to the question information and the optimal reasoning template.

14. The method according to claim 13, wherein determining the answer information corresponding to the question information according to the core element information corresponding to the question information and the optimal reasoning template comprises:
determining a word characteristic of the core element information, and obtaining a filling point corresponding to the word characteristic of the core element information;
adding the filling point corresponding to the word characteristic of the core element information into the optimal reasoning template to obtain a final reasoning template;
filling the keyword of the question information and the core element information corresponding to the question information into respective filling point of the final reasoning template to obtain a reasoning statement; and
determining according to a correspondence between a preset reasoning statement and the answer information, answer information corresponding to the obtained reasoning statement as the answer information corresponding to the question information.

15. The method according to claim 1, wherein the system priorities is preset; or the system priorities is confirmed by the user; or the system priorities represents an amount of data contained in the question analysis system.

16. The method according to claim 1, wherein determining the question category of the question information comprises:
extracting key information from the question information, wherein the key information comprises an entity word and/or a modal word; and
determining the question category of the question information according to a correspondence between preset key information and the question category.

17. The method according to claim 1, wherein determining the query engine corresponding to the question category comprises:
determining the query engine corresponding to the question category according to a preset mapping relationship between the question category and the query engine;
wherein the question category is one of the following: a number category, a short text category, a long text category, a general demand category and a judgment category.

18. A server that interacts with a client through digital data communication, applied in intelligent technology and natural language technology, comprising:
at least one processor; and
a memory communicatively connected to the at least one processor; wherein,
the memory stores an instruction executable by the at least one processor, and the instruction is executed by the at least one processor to enable the at least one processor to execute the following steps:
receiving a question answering instruction sent by the client, wherein the question answering instruction is triggered by a user through the client;
determining a question category of question information in response to the question answering instruction, wherein the question answering instruction is used to indicate the question information;
determining a query engine corresponding to the question category, and invoking multiple question analysis systems corresponding to the query engine according to the query engine; and
sending answer information to the client when the answer information corresponding to the question information is determined according to a current question analysis system in a process of processing the question information by sequentially using the multiple question analysis systems according to system priorities of the question analysis systems, when the answer information corresponding to the question information is not determined according to the current question analysis system, a next question analysis system determined according to the system priorities of the question analysis systems is used to process the question information;

wherein the query engine is used for providing users with comprehensive information services based on preset algorithms;

wherein the multiple question analysis systems comprise: a knowledge graph system, a reasoning question answering system, a document question answering system, and a frequently-asked questions (FAQ) question answering system;

wherein the knowledge graph system is used to indicate answer information corresponding to an entity in the question information;

the reasoning question answering system is used to indicate a reasoning template corresponding to the question information, wherein the reasoning template is used to determine the answer information, the reasoning template comprises multiple filling points with an order relationship, and the filling point has a word characteristic;

the document question answering system is used to indicate a paragraph corresponding to the question information, wherein the paragraph is used to determine the answer information; and the FAQ question answering system is used to indicate a further question related to the question information, wherein the further question and the question information are used to determine the answer information.

19. A non-transitory computer readable storage medium storing a computer instruction, wherein the computer instruction is used to enable a server that interacts with a client through digital data communication, applied in intelligent technology and natural language technology to execute the following steps:

receiving a question answering instruction sent by the client, wherein the question answering instruction is triggered by a user through the client;

determining a question category of question information in response to the question answering instruction, wherein the question answering instruction is used to indicate the question information;

determining a query engine corresponding to the question category, and invoking multiple question analysis systems corresponding to the query engine according to the query engine; and sending answer information to the client when the answer information corresponding to the question information is determined according to a current question analysis system in a process of processing the question information by sequentially using the multiple question analysis systems according to system priorities of the question analysis systems, when the answer information corresponding to the question information is not determined according to the current question analysis system, a next question analysis system determined according to the system priorities of the question analysis systems is used to process the question information;

wherein the query engine is used for providing users with comprehensive information services based on preset algorithms;

wherein the multiple question analysis systems comprise: a knowledge graph system, a reasoning question answering system, a document question answering system, and a frequently-asked questions (FAQ) question answering system;

wherein the knowledge graph system is used to indicate answer information corresponding to an entity in the question information;

the reasoning question answering system is used to indicate a reasoning template corresponding to the question information, wherein the reasoning template is used to determine the answer information, the reasoning template comprises multiple filling points with an order relationship, and the filling point has a word characteristic;

the document question answering system is used to indicate a paragraph corresponding to the question information, wherein the paragraph is used to determine the answer information; and the FAQ question answering system is used to indicate a further question related to the question information, wherein the further question and the question information are used to determine the answer information.

* * * * *